United States Patent [19]

Baldwin et al.

[11] 3,917,719

[45] Nov. 4, 1975

[54] PROCESS FOR THE PREPARATION OF 4-NITRO-M-CRESOL

[75] Inventors: Roger Allen Baldwin, Oklahoma City, Okla.; Marion Frederick Hawthorne, Los Angeles; Ming Tzu Cheng, Buena Park, both of Calif.

[73] Assignee: Kerr-McGee Chemical Corporation, Oklahoma City, Okla.

[22] Filed: June 8, 1973

[21] Appl. No.: 368,295

Related U.S. Application Data

[63] Continuation-in-part of Ser. No. 43,180, June 3, 1970, abandoned.

[52] U.S. Cl. ............................................ 260/622 R
[51] Int. Cl.² ........................................ C07C 79/26
[58] Field of Search ............ 260/622 R, 621 N, 622; 43/180

[56] References Cited
UNITED STATES PATENTS 3,320,324  5/1967  Kauba ............................ 260/621 N
3,510,527  5/1970  Prosser .......................... 260/622 R
3,519,693  7/1970  Harvey ........................... 260/622 R

FOREIGN PATENTS OR APPLICATIONS 1,165,637  10/1969  United Kingdom ............. 260/622 R
140,955    4/1920   United Kingdom ............. 260/622 R

OTHER PUBLICATIONS

Hickenbottom, "Reaction of Organic Compounds".

Primary Examiner—James O. Thomas, Jr.
Assistant Examiner—W. B. Lone
Attorney, Agent, or Firm—William G. Addison

[57] ABSTRACT

The invention provides a process for the preparation of 4-nitro-m-cresol which includes nitrosating m-cresol by simultaneously introducing separate streams of m-cresol and a nitrosating agent into a quantity of cold aqueous acid to form 4-nitroso-m-cresol and thereafter introducing both sodium nitrate and nitric acid to effect the oxidation of the nitroso compound to form 4-nitro-m-cresol.

4 Claims, No Drawings

PROCESS FOR THE PREPARATION OF 4-NITRO-M-CRESOL

CROSS REFERENCE TO RELATED APPLICATIONS

This application is a continuation-in-part of application Ser. No. 43,180 filed June 3, 1970 now abandoned.

BACKGROUND OF THE INVENTION

The compound 4-nitro-m-cresol is useful as an indicator as well as an intermediate in the preparation of insecticide compounds such as O,O-dimethyl-O-(3-methyl-4-nitrophenyl)phosphorthioate.

Heretofore, various processes have been suggested for the preparation of 4-nitro-m-cresol. Generally, these include either the direct nitration of m-cresol or an initial nitrosation followed by oxidation of the intermediate 4-nitroso-m-cresol. The direct nitration procedures produce 4-nitro-m-cresol but side reactions also occur resulting in the formation of varying quantities of the isomeric nitro-m-cresols as well as oxidation products, tars, and other dark colored impurities. Such side reactions necessarily result in low yields of the desired product and require the subsequent utilization of difficult separation and purification steps. Obviously, low yields, mixtures of isomers, difficulties in purification and the like make such processes of little commercial significance. This is particularly important in those cases where only one of the isomers has biological activity of its own or as moities in subsequent compounds. This is true for 4-nitrophenol and 4-nitro-m-cresol which are moities of the useful insecticides, O,O-dimethyl-O-4-nitrophenylphosphorothioate, and O,O-dimethyl-O-(3-methyl-4-nitrophenyl)phosphorothioate, respectively.

The prior art nitrosation-oxidation processes include the nitrosation of m-cresol to form 4-nitroso-m-cresol, recovering that product and then oxidizing it to form 4-nitro-m-cresol. The prior known nitrosation processes have not been completely satisfactory since the yields are relatively low due to the formation of undesirable tars and colored impurities.

Thus, in one such method, dilute sulfuric acid is added to the phenolic compound that has been dissolved in a slight excess of sodium hydroxide and sodium nitrate. The reaction is carried out at a temperature of about 0°–5°C. and after the reaction is complete, the mixture is poured into ice and the product isolated therefrom; see W. J. Hickenbottom, Reactions of Organic Compounds, Longmums, Green and Co., New York, 1950, p.118.

In another process, solid quantities of sodium nitrite are added to an ethanol solution of a phenolic compound and concentrated hydrochloric acid at 0°C. Again, the reaction mixture is poured onto ice and the product isolated; see R. M. Hollingworth, "Biochemical Factors Determining Selective Toxicity of the Insecticide Sumithion and Its Analogs" PhD. Thesis, University of California, Riverside, 1966, p. 53.

In still another process, dilute sulfuric acid is added to a suspension of a phenolic compound and sodium nitrite maintained in a large volume of ice water. The temperature is maintained below 5°C. until the reaction is completed, after which the product is recovered by filtration; see D. A. Shirley, Preparation of Organic Intermediates, John Wiley & Sons, Inc., New York, 1951, p. 203.

U.S. Pat. No. 3,320,324 discloses a process in which phenol, sodium nitrite, and mineral acid, each in the form of an aqueous solution, are continuously and simultaneously brought together with rapid agitation at 0°–15°C. in an aqueous medium containing the sodium salt of said mineral acid and saturated with the para-nitrosophenol product. The aqueous medium is maintained at a pH less than 5 during the reaction. The patentee indicates that such a process results in yields of up to, at most, about 85% of p-nitrosophenol.

None of the foregoing nitrosation processes is completely satisfactory because the product obtained is dark-colored or obtainable in only relatively poor yields, i.e., no more than about 85%.

The 4-nitroso-m-cresol obtained by such prior art processes can be oxidized to 4-nitro-m-cresol. However, the oxidation processes suggested heretofor have not been completely satisfactory. In Hollingsworth, it is suggested to effect the oxidation of 4-nitroso-m-cresol utilizing dilute nitric acid, i.e., one volume of concentrated nitric acid for three volumes of water. That process is described as being carried out at 40°C. for 1½ hours; however, it produces a product in a yield of only about 31.5%.

Another process which has been suggested utilizes 30% hydrogen peroxide as an oxidizing agent, the reaction being carried out in glacial acetic acid and with catalytic amounts of ammonium molybdate. It has been found that when using 4-nitroso-m-cresol, the resultant reaction mixture must be heated briefly to initiate the reaction. After workup, which includes dilution with water followed by extraction with ether, yields of only about 60% of the 4-nitro-m-cresol are obtained.

It also has been suggested to prepare nitrophenolic compounds by the caustic hydrolysis of chloronitroaromatic derivatives. The use of such caustic hydrolysis suffers from the disadvantage, however, that it is difficult to obtain the desired isomer required for the hydrolysis without the formation of unwanted isomers which must be removed from the mixture. Thus, nitration of chlorobenzene, a well-known procedure, yields about a 65/35 mixture of the para- and ortho- isomers of chloronitrobenzene. Subsequent caustic hydrolysis of this mixture yields the corresponding ortho- and para- nitrophenols. However, since ortho-nitrophenol is inactive in insecticides such as methyl and ethyl parathion, it must be removed from the mixture before the para-nitrophenol can be used in insecticide manufacture.

The similar caustic hydrolysis of 3-methyl-4-nitrochlorobenzene is clearly impractical. It is well known that the chlorination of toluene gives very little of the m-chlorotoluene required for subsequent nitration to 3-methyl-4-nitrochlorobenzene. The nitration step also would yield a mixture of products requiring separation prior to and/or subsequent to the caustic hydrolysis.

Thus, while several prior art processes have been suggested, none is believed to be completely satisfactory commercially.

DESCRIPTION OF THE INVENTION

The present invention provides an in situ procedure for preparing 4-nitro-m-cresol which includes nitrosating m-cresol to form 4-nitroso-m-cresol in an acid medium and then utilizing the acid values in that medium to generate nitric acid plus added nitric acid to convert the nitroso compound to the desired 4-nitro-m-cresol product.

More particularly, the invention comprises simultaneously introducing separate streams containing an aqueous solution of nitrosating agent and m-cresol, there being about 1.18 to 2.0 moles of nitrosating agent per mole of m-cresol, into a reaction vessel containing a solution of a mineral acid present in an amount sufficient to provide from about 3.3 to 8.0 moles of hydrogen ion per mole of m-cresol. The mixture is continuously and vigorously agitated while maintaining the temperature within the range of from about −5° to +10°C. The compound produced is particulate 4-nitroso-m-cresol suspended in the acid solution. Thereafter, the mixture is warmed to about 20° to about 25°C. and sodium nitrate (aqueous or solid) and nitric acid are added to effect oxidation of the nitroso compound to 4-nitro-m-cresol.

Suitable nitrosating agents include alkali metal and alkaline earth metal nitrites. Particularly satisfactory results are obtainable using sodium or potassium nitrite.

Any mineral acid may be used in the nitrosation process of this invention but particularly satisfactory results are obtainable using either hydrochloric acid or sulfuric acid. The use of hydrochloric acid is preferred since it has been determined that the use of this reactant results in a much faster reaction which can be controlled readily.

The amount of mineral acid employed has been found to be critical to the successful operation of the nitrosation process. Thus, the vessel in which the reaction is to be carried out initially must contain a large quantity of mineral acid. Specifically, the acid must be present initially in amounts sufficient to provide from about 2.4 to 4.0 moles of hydrogen ion for each mole of nitrosating agent to be added.

Preferably, at least about 3.0 moles of hydrogen ion are provided for each mole of nitrite. If lesser amounts of hydrogen ion are provided, the reaction time is markedly reduced and product yields and quality are adversely affected. It is a feature of the present invention that the reaction rate is so fast that side reactions are avoided or minimized to such an extent that the excess acid values remaining after removal of the product are not contaminated and, therefore, can be recycled and reused in the process.

It has been determined that the initial normality of the mineral acid in the nitrosation reaction mixture must be controlled since this affects the rate of reaction as well as the solubility of the reactants and reaction product in the acid. The normality of the acid solution initially should be within the range of from about 2.5 to about 7.5, preferably about 3.0 to 4.0.

The quantities of nitrosating agent and m-cresol employed are critical. Thus, it has been found that initially there must be a slight stoichiometric excess of nitrosating agent to m-cresol to provide the desirable high yields. On the other hand, too much nitrosating is wasteful. The preferred ratio of these reactants is 1.2 moles of sodium nitrite for each mole of m-cresol although the range may be from as low as about 1.18 to as high as about 2.0.

In general, it has been found that the nitrosation reaction is complete in about 1 to 3 hours when hydrochloric acid is employed. When sulfuric acid is used, under comparable reaction conditions, somewhat longer reaction times are required. The actual reaction time of any given run will depend, of course, upon the particular reactants employed. The rapid rate at which the process of this invention is completed is surprising in view of the prior art processes in which the nitrosating reaction usually took considerably longer for completion and still resulted in low yields of poor quality product.

Once the above nitrosation of m-cresol has been completed and the resulting acidic slurry of 4-nitroso-m-cresol has been allowed to warm up to about 20°C., sodium nitrate, either in solid form or in aqueous solution, is introduced to the acidic reaction mixture in sufficient quantity to be essentially equal to the amount of hydrogen ions remaining unused from the nitrosation step. This results in the in situ generation of a portion of the nitric acid for the oxidation of the 4-nitroso-m-cresol to the desired 4-nitro-m-cresol. As will be seen from the data of Tables I and II below, this amount of added sodium nitrate alone does not generate sufficient nitric acid to effect the desired oxidation. To effect the oxidation of substantially all of the 4-nitroso-m-cresol to 4-nitro-m-cresol, it is necessary to introduce additional nitric acid to the reaction mixture.

The molar ratio of nitric acid to 4-nitroso-m-cresol is critical to the success of the oxidation. The initial nitrosation step of the present process results in substantially quantitative yields of 4-nitroso-m-cresol. For convenience, therefore, the required amount of nitric acid is expressed as a molar ratio of nitric acid to m-cresol initially introduced into the reaction. This ratio should be in the range of about 3.0 to about 4.2, preferably about 3.5 to 4.0.

However, even the preferred molar ratio of nitric acid to m-cresol will be ineffective in the oxidation if the reaction solution is too dilute. Examples 8 and 13 in Table II suggest a lower limit to the dilution of about 1.5 apparent molality. Even though the molar ratio of nitric acid to m-cresol is in the desired range, the apparent nitric acid concentration of only 1.5 molal results in impure 4-nitro-m-cresol (Example 8) and in the recovery of 4-nitroso-m-cresol, (Example 13). However, in Example 9, under conditions very similar to those of Example 13, product was isolated. If the apparent molality of the nitric acid is increased to about 2.0, oxidation then proceeds routinely and 4-nitro-m-cresol is obtained (see Example 14). Therefore, the apparent molality of the nitric acid, should be preferably in the range of about 2 to 4 molal. Above four molality, the product becomes contaminated by too many impurities (Example 10).

While both hydrochloric acid and sulfuric acid can be used in this in situ oxidation of 4-nitroso-m-cresol to 4-nitro-m-cresol, hydrochloric acid generally results in easier to control reactions and in a more pure product. Additionally, with sulfuric acid, more nitrogen dioxide was observed which is indicative of undesirable side reactions.

The temperature of the oxidation step can be in the range of about 20° to 40°C., preferably about 30° to 40°C.

Should an extremely pure 4-nitro-m-cresol be desired for use in an insecticide, the technical material can be purified in the following manner: The reaction product is separated and, if desired, washed free of excess acidic materials. The wet cake of 4-nitro-m-cresol is dissolved in hot aqueous alkali metal hydroxide solution to adjust its pH to about 10.5 to 11.0. It then is treated with an activated charcoal, filtered while hot, and alkali metal halide is added to salt out the cresol as the dihydrate of the alkali metal salt of 4-nitro-m-cresol. After cooling, the salt is recovered by filtration and subsequently is reconverted to pure 4-nitro-m-cresol melting at 127°–128°C. (Example 18). This product is eminently suited for use in the manufacture of insecticides such as O,O-dimethyl-O-(3-methyl-4-nitrophenyl)phosphorothioate.

PREFERRED EMBODIMENTS OF THE INVENTION

The following specific examples are set forth to further illustrate the process of the present invention. It should be understood that these examples are illustrative and not limiting, the scope of the invention being defined by the appended claims. All parts given are by weight unless otherwise indicated.

EXAMPLE 1

A mixture of 1050 ml of water and 450 ml of 37% (12 Normal) hydrochloric acid (5.43 moles of hydrogen ion) in a 2-liter beaker, equipped with a high-speed stirrer and thermometer, was cooled to below 5°C. by means of an external cooling bath to provide a 3.6 normal acid solution. To the acid were simultaneously introduced 165.3 g (98% purity, 1.5 mole) of m-cresol and 124 g (1.8 mole, 20% excess based on m-cresol) of sodium nitrite dissolved in 180 ml of water. The addition was carried out so as to maintain approximately 1 to 1.2 moles of nitrite for each mole of m-cresol. During this addition, the reaction temperature was held at about 3° to 5°C. by means of the cooling bath. The resulting slurry of 4-nitroso-m-cresol in the acid was warmed to about 24°C. with stirring, at which time 200 ml of water was first introduced followed by 280.5 g (3.3 moles) of sodium nitrate in 360 ml of water. These additions required 30 minutes. The reaction temperature further increased to about 28°C. and then a solution containing 171 ml (2.7 moles) of 70% nitric acid in 200 ml of water was added over 15 minutes. The reaction temperature further increased to about 32°C. The reaction slurry was then allowed to stir for 2.5 hours with the temperature being held below 40°C. The solids were filtered, washed with water (some of the excess acid can be neutralized with sodium bicarbonate), filtered, and vacuum-dried for 15 hours. The resulting red-colored, granular 4-nitro-m-cresol weighed approximately 208 g (approximately a 90% yield based on the starting m-cresol) and melted over the range of 120°–125°C. Infrared spectroscopy indicated that the product was about 95% pure.

Example 2–17 are set forth in Tables I and II, below. In Examples 2–6 and 17 the m-cresol used had a purity of 95%. In the other examples the m-cresol had a purity of 98%. Sulfuric acid was used in place of hydrochloric acid in Examples 2, 3, 8 and 17. In Examples 3, 4 and 5, solid sodium nitrite was introduced, followed by the addition of the necessary water. The percent purity values were obtained by infrared spectroscopy.

TABLE I

In Situ Preparation of 4-Nitro-M-Cresol

| A. Nitrosation Step Example | 2 | 3 | 4 | 5 | 6 | 7 | 8 | 9 |
|---|---|---|---|---|---|---|---|---|
| m-Cresol | | | | | | | | |
| Moles | 0.475 | 0.475 | 0.475 | 0.475 | 0.5 | 0.5 | 0.5 | 0.5 |
| Sodium Nitrite | | | | | | | | |
| Moles | 0.7 | 0.7 | 0.6 | 0.6 | 0.6 | 0.6 | 0.6 | 0.6 |
| Molality | 10 | 5.1 | 8.6 | 8.6 | 8.6 | 8.6 | 8.6 | 8.6 |
| Mineral Acid | | | | | | | | |
| Moles of Acid | 1.05 | 1.05 | 1.8 | 1.8 | 1.8 | 1.8 | 0.9 | 1.8 |
| Initial Normality | 3.2 | 4.16 | 3.6 | 3.6 | 3.6 | 3.6 | 4.0 | 1.9 |
| Reaction | | | | | | | | |
| Temp. °C | 2 to 3 | −3 to +3 | 3 to 5 | 0 to 3 | 0 to 7 | 0 to 7 | 1 to 3 | 2 to 5 |
| Time, Min | 60 | 180 | — | 45 | 35 | 27 | 105 | 15 |
| B. Oxidation Step | | | | | | | | |
| Sodium Nitrate | | | | | | | | |
| Moles | 0.7 | 1.2 | 1.1 | 1.1 | 1.1 | 1.1 | 1.1 | 1.1 |
| Molality | 7.0 | — | — | — | 11 | 9.6 | 9.2 | 7.3 |
| Nitric Acid | | | | | | | | |
| Moles | 0.25 | 0.8 | 0.3 | 0.9 | 0.9 | 0.9 | 0.58 | 0.9 |
| Molarity | 16 | 16 | 16 | 16 | 16 | 16 | 3.87 | 16 |
| Reaction | | | | | | | | |
| Temp. °C | 27–60 | 22–30 | 16–32 | 24–32 | 34–44 | 27–40 | 30–42 | 28–35 |
| Time, Hr | 15 | 2.25 | 2.5 | 6.0 | 2.5 | 2.5 | 2.25 | 4.0 |
| Yield, % | — | 86 | — | 92.5 | 83.5 | 91 | 80.5 | 83.5 |
| Purity, % | — | — | — | 95 | 95 | 95 | — | 95 |
| Melting Point °C | 158 | 115–120 | 161–164 | 121–124 | 118–124 | 120–124.5 | 110–114 | 115–120 |

| A. Nitrosation Step Example | 10 | 11 | 12 | 13 | 14 | 15 | 16 | 17 |
|---|---|---|---|---|---|---|---|---|
| m-Cresol | | | | | | | | |
| Moles | 0.5 | 0.5 | 0.5 | 0.5 | 0.5 | 0.5 | 0.5 | 0.95 |
| Sodium Nitrite | | | | | | | | |
| Moles | 0.6 | 0.74 | 0.6 | 0.6 | 0.6 | 0.6 | 0.7 | 1.4 |
| Molality | 10 | 10 | 10 | 10 | 10 | 10 | 11.6 | 14 |
| Mineral Acid | | | | | | | | |
| Moles of Acid | 1.8 | 1.8 | 1.8 | 1.8 | 1.8 | 1.8 | 1.8 | 2.1 |
| Initial Normality | 6.0 | 3.6 | 3.6 | 3.6 | 3.6 | 3.6 | 3.6 | 3.5 |
| Reaction | | | | | | | | |
| Temp. °C | 1 to 10 | 2 to 5 | 1 to 4 | 2 to 8 | 0 to 7 | 3 to 6 | 2 to 8 | 0 to 5 |
| Time, Min | 80 | 30 | 55 | 30 | 30 | 30 | 35 | 60 |
| B. Oxidation Step | | | | | | | | |
| Sodium Nitrate | | | | | | | | |
| Moles | 1.1 | 1.1 | 1.1 | 1.1 | 1.1 | 1.1 | 1.1 | 1.2 |
| Molality | 9.6 | 2.58 | — | 9.1 | 9.1 | 9.1 | 9.1 | 7.0 |
| Nitric Acid | | | | | | | | |
| Moles | 0.9 | 0.9 | 0.9 | 0.9 | 0.9 | 0.9 | 0.9 | 0.0 |
| Molarity | 16 | 16 | 16 | 1.27 | 2.35 | 4.88 | 4.88 | — |

TABLE I-continued

In Situ Preparation of 4-Nitro-M-Cresol

| A. Nitrosation Step Example | 2 | 3 | 4 | 5 | 6 | 7 | 8 | 9 |
| --- | --- | --- | --- | --- | --- | --- | --- | --- |
| Reaction Temp. °C | 31–35 | 30–32 | 30–33 | 30–34 | 30–33 | 30–36 | 33–36 | 20 |
| Time, Hr | 2.0 | 3.0 | 2.5 | 4.0 | 3.0 | 3.5 | 3.0 | 2.0 |
| Yield % | 91 | 90 | 90 | — | 93.5 | 88.3 | 91 | — |
| Purity % | 95 | 95 | 95 | — | 95 | 95 | 95 | — |
| Melting Point °C | 104–115 | 118–124 | 118–124 | 164–167 | 115–124 | 115–124 | 120–125 | 155–158 |

TABLE II

Effect of $HNO_3$ on the Oxidation of 4-nitroso-m-cresol

| Example | Approximate Ratio of $HNO_3$ To m-cresol | Nitric Acid Molality* | Result |
| --- | --- | --- | --- |
| 1 | 4.0 | 2.5 | Nitrocresol |
| 2 | 2.0 | 1.23 | Nitrosocresol Recovered |
| 3 | 4.2 | 3.35 | Nitrocresol |
| 4 | 2.97 | 2.36 | Nitrosocresol Recovered |
| 5 | 4.2 | 2.77 | Nitrocresol |
| 6 | 4.0 | 2.95 | Nitrocresol |
| 7 | 4.0 | 2.51 | Nitrocresol |
| 8 | 3.36 | 1.55 | Impure Nitrocresol |
| 9 | 4.0 | 1.48 | Nitrocresol |
| 10 | 4.0 | 4.35 | Impure Nitrocresol |
| 11 | 4.0 | 1.98 | Nitrocresol |
| 12 | 4.0 | 2.87 | Nitrocresol |
| 13 | 4.0 | 1.5 | Nitrosocresol Recovered |
| 14 | 4.0 | 2.0 | Nitrocresol |
| 15 | 4.0 | 2.5 | Nitrocresol |
| 16 | 4.0 | 2.5 | Nitrocresol |
| 17 | 1.26 | 0.85 | Nitrosocresol Recovered |

*Apparent molality of the final reaction slurry after completion of the addition of the sodium nitrate and nitric acid, i.e., the nitric acid molality the slurry would have if no oxidation were occurring.

The 4-nitro-m-cresol recovered is usually brick red in color and has a varying melting point range. In this form, it may not be suitable for certain applications. However, pure 4-nitro-m-cresol can be readily obtained in the following manner:

EXAMPLE 18

The red solids resulting from the nitrosation-oxidation of 165.3 g (1.5 mole, 98% purity) of m-cresol are recovered from the acid reaction mixture by filtration. The solids are washed with 339 g of water and then with 270 g of 25% brine. The wet cake, about 288 g, is slurried with 1100 g water and the pH adjusted to about 6.8 after which the mixture is heated to boiling. An additional 80 ml of 50% sodium hydroxide (1.5 mole) then is introduced to adjust the pH to about 10.9. The dark colored, hot solution is treated with 7 g of activated charcoal, heated at boiling briefly, and filtered while hot to remove the decolorizing agent. Approximately 230 g of water is used to rinse out the flasks and free the filter cake of product. While the filtrate is still hot, 225 g of powdered sodium chloride is added and the solution allowed to cool and precipitate sodium 4-nitro-m-cresolate dihydrate.

After cooling, the resulting off-yellow sodium salt is recovered by filtration of the cold brine mixture. This separation is required since acidification of the filtrate yields a black, tacky residue which would recontaminate the product. The wet sodium 4-nitro-m-cresolate is first slurried with 1000 g of hot water and then is titrated with 97 ml of concentrated hydrochloric acid (78% of theory based upon the initial m-cresol. The product initially oils, then solidifies to form crystalline, light-tan colored, 4-nitro-m-cresol. The dried crystals weight 174 g (1.14 mole, 75.8% yield based upon the starting m-cresol) and melt at 127°–128°C. Thin layer chromatography indicates the presence of only one component while the infrared spectrum does not contain any apparent foreign absorptions. Titration with base further indicates that the 4-nitro-m-cresol is about 99% pure.

WHAT IS CLAIMED IS:

1. The process which comprises simultaneously introducing separate streams of 1 mole of m-cresol and 1.18 to 2.0 moles of a nitrosating agent into a mineral acid solution selected from the group consisting of hydrochloric and sulfuric acid to produce 4-nitroso-m-cresol suspended in the acid, said nitrosating agent being selected from the group consisting of alkali and alkaline earth metal nitrites; said acid solution having an initial normality within the range of 2.5 to 7.5, being present in an amount sufficient to provide from about 3.3 to 8.0 moles of hydrogen ion for each mole of m-cresol introduced and from about 2.4 to 4.0 moles of hydrogen ion for each mole of nitrosating agent introduced; agitating the mixture at a temperature of from about −5° to +10°C and thereafter warming the suspension of 4-nitroso-m-cresol and maintaining the temperature of the suspension at from about 20° to 40°C. while adding separate streams of sodium nitrate and nitric acid to oxidize the 4-nitroso-m-cresol to 4-nitro-m-cresol; said sodium nitrate being added in an amount equivalent to the unconsumed hydrogen ion and the nitric acid being added in sufficient quantity to provide a total apparent nitric acid molality in the range of about 2 to 4 and a total molar ratio of nitric acid to m-cresol in the range of 3.0 to about 4.2.

2. A process as set forth in claim 1 in which the nitrosating agent is selected from the group consisting of sodium and potassium nitrites.

3. A process as set forth in claim 1 in which the mineral acid is hydrochloric acid.

4. A process as set forth in claim 1 in which the 4-nitro-m-cresol is recovered from the acid mixture, dissolved in sufficient hot aqueous alkali metal hydroxide solution to provide a resulting mixture having a pH of from about 10.5 to 11.0, alkali metal halide is added to salt out the cresol as the dihydrate of the alkali metal salt of 4-nitro-m-cresol, the mixture is cooled and filtered and the filter cake then is acidified by treatment with mineral acid to form substantially pure 4-nitro-m-cresol.

* * * * *